Figure 1:
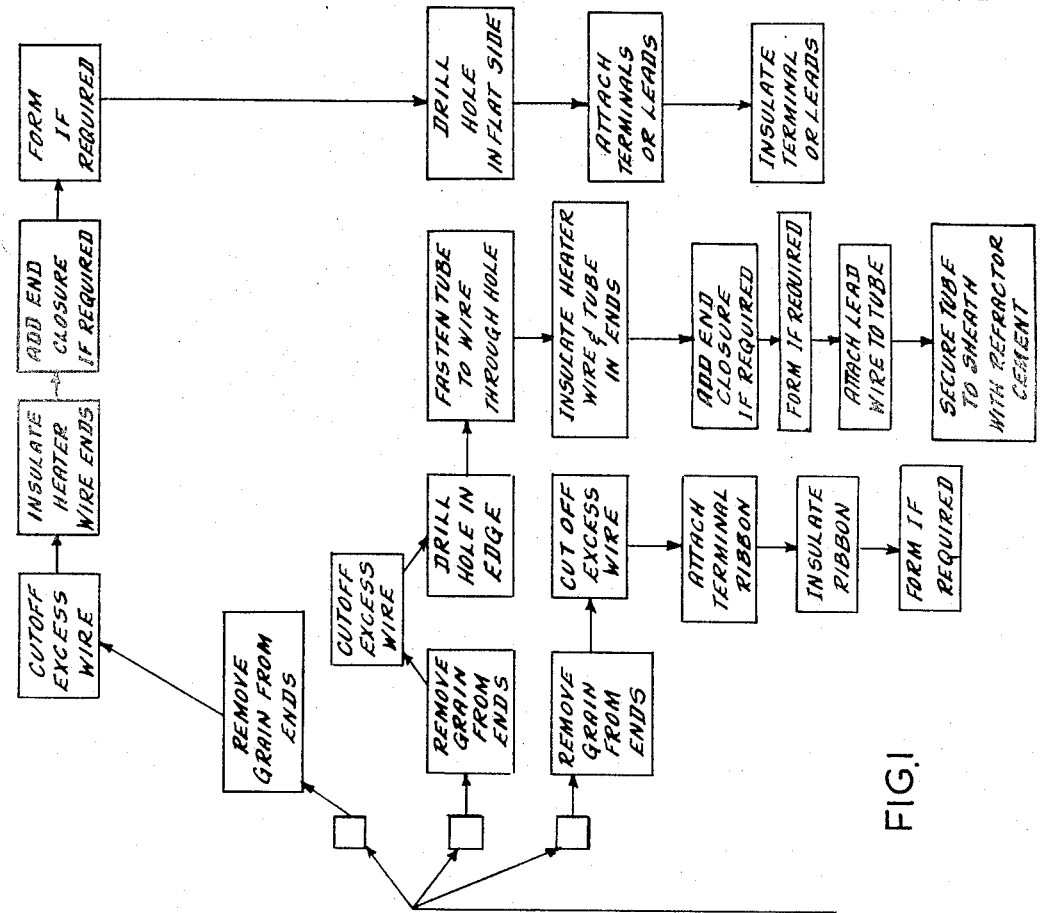
Figure 1:
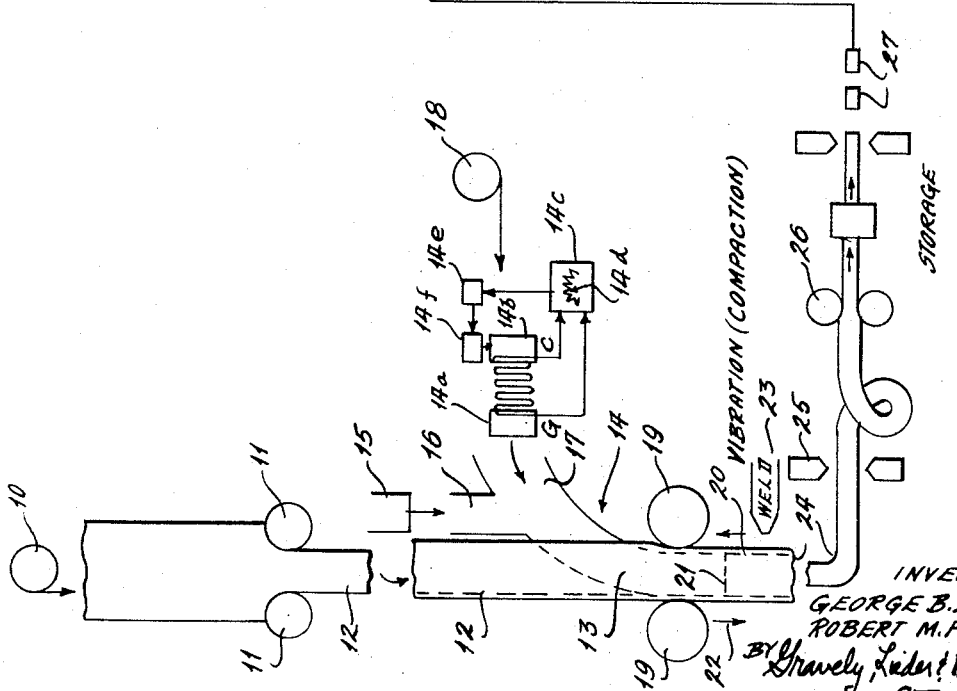

Sept. 24, 1968 G. B. DESLOGE ET AL 3,402,465
METHOD FOR CONTINUOUSLY MAKING SHEATHED HEATING ELEMENTS
Filed July 15, 1963 5 Sheets-Sheet 1

INVENTORS,
GEORGE B. DESLOGE
ROBERT M. FRAYNE
BY Gravely, Lider & Woodruff
ATTORNEYS.

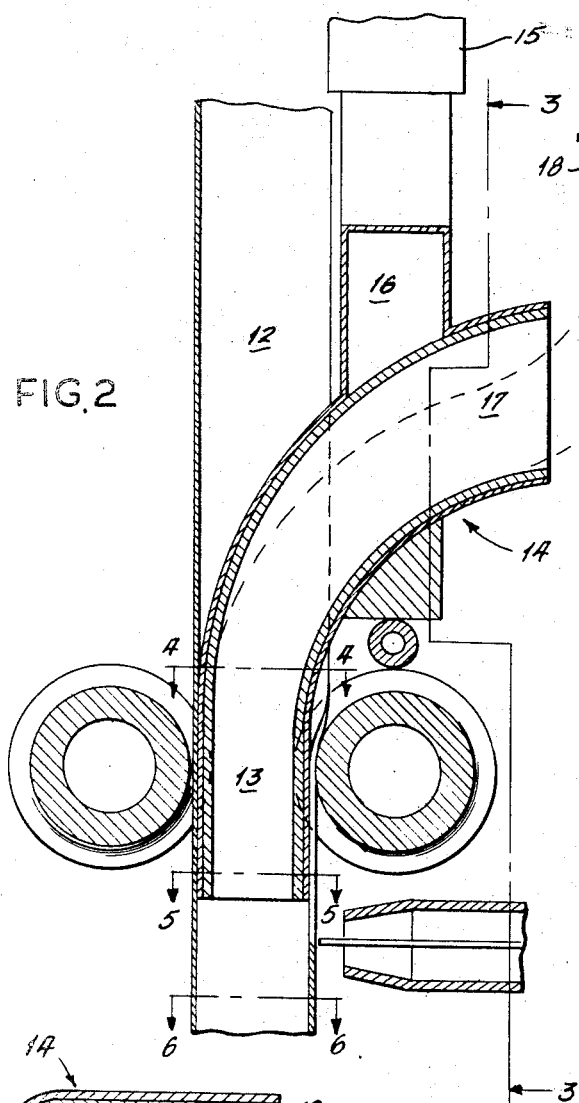
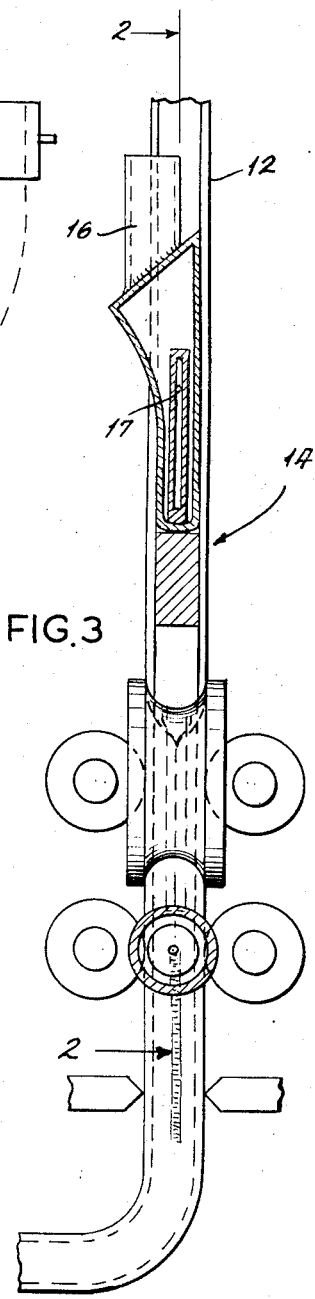
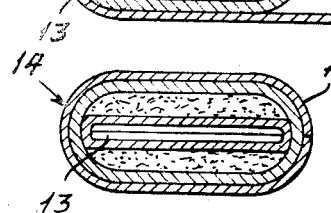
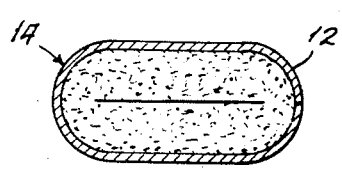

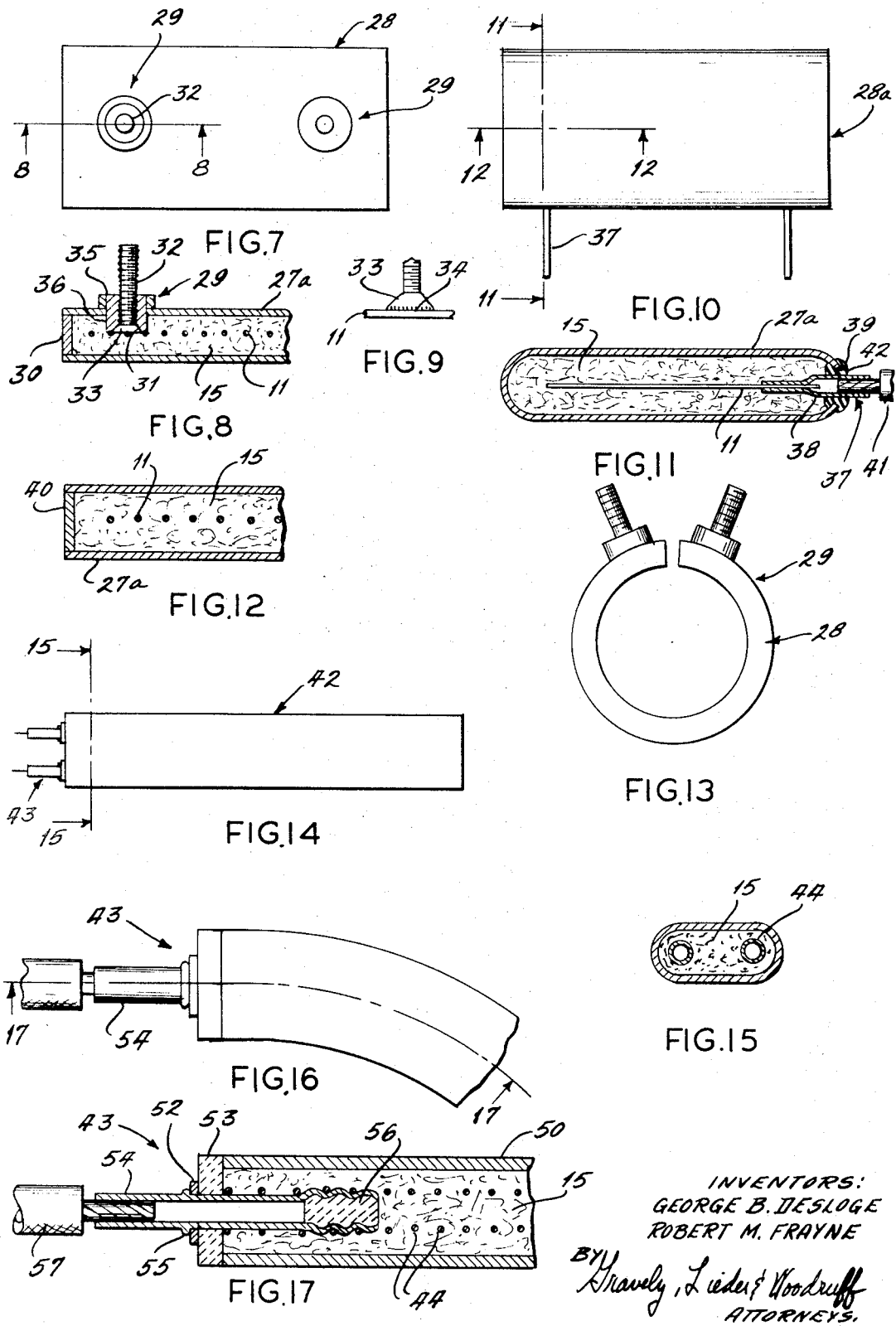

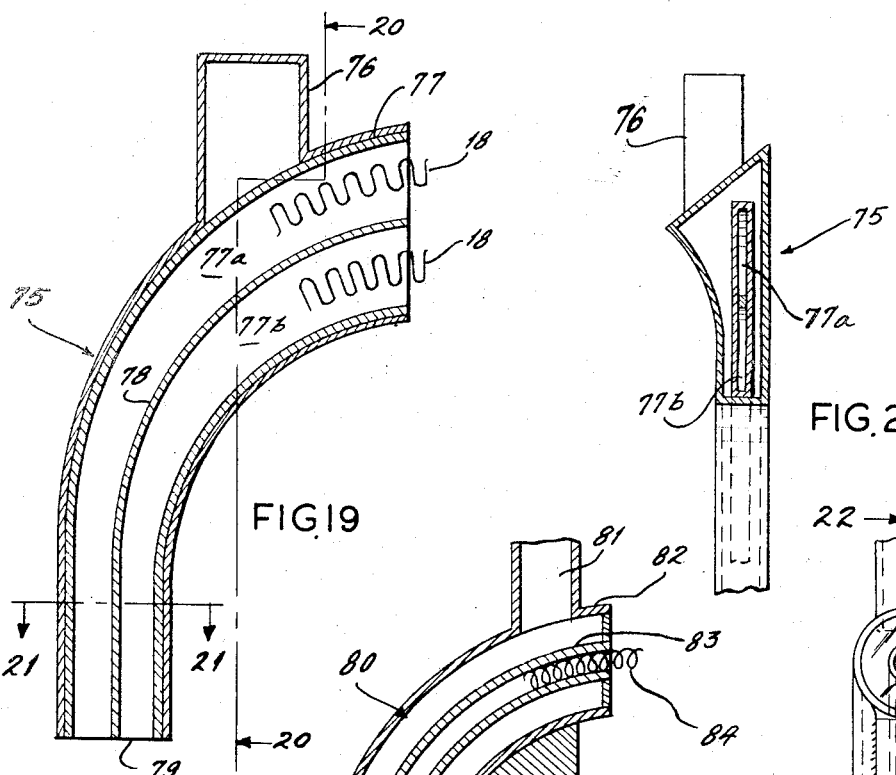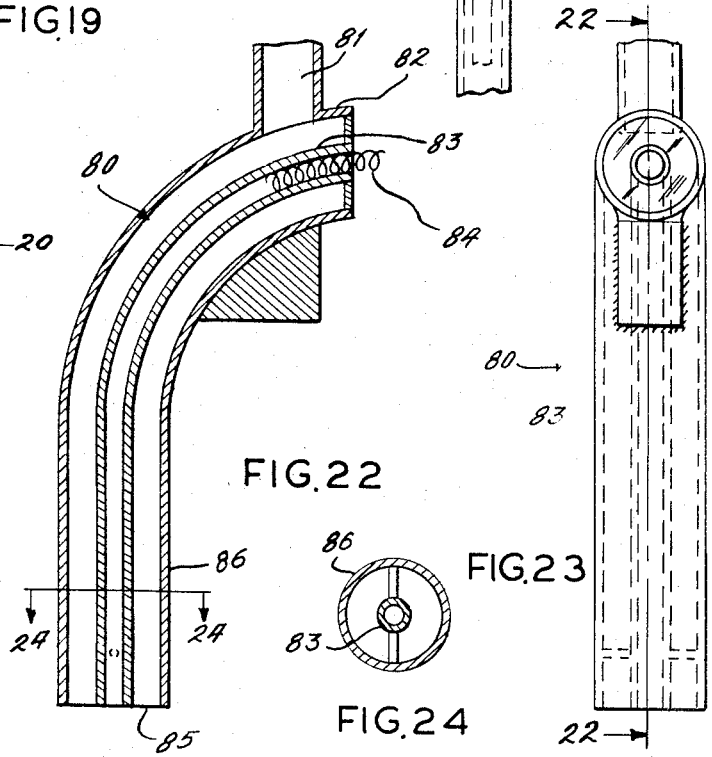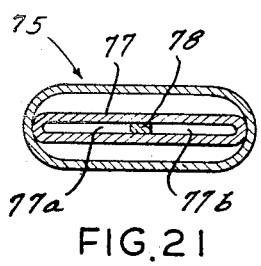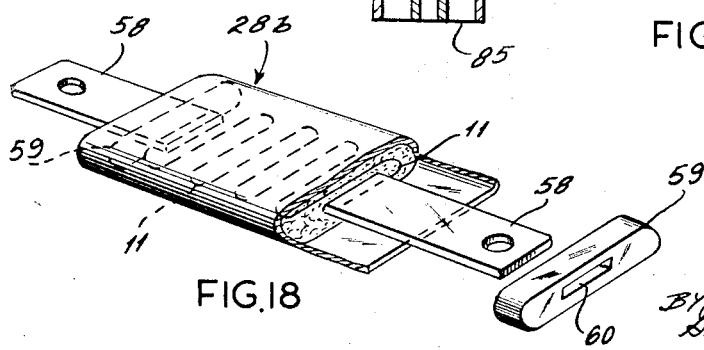

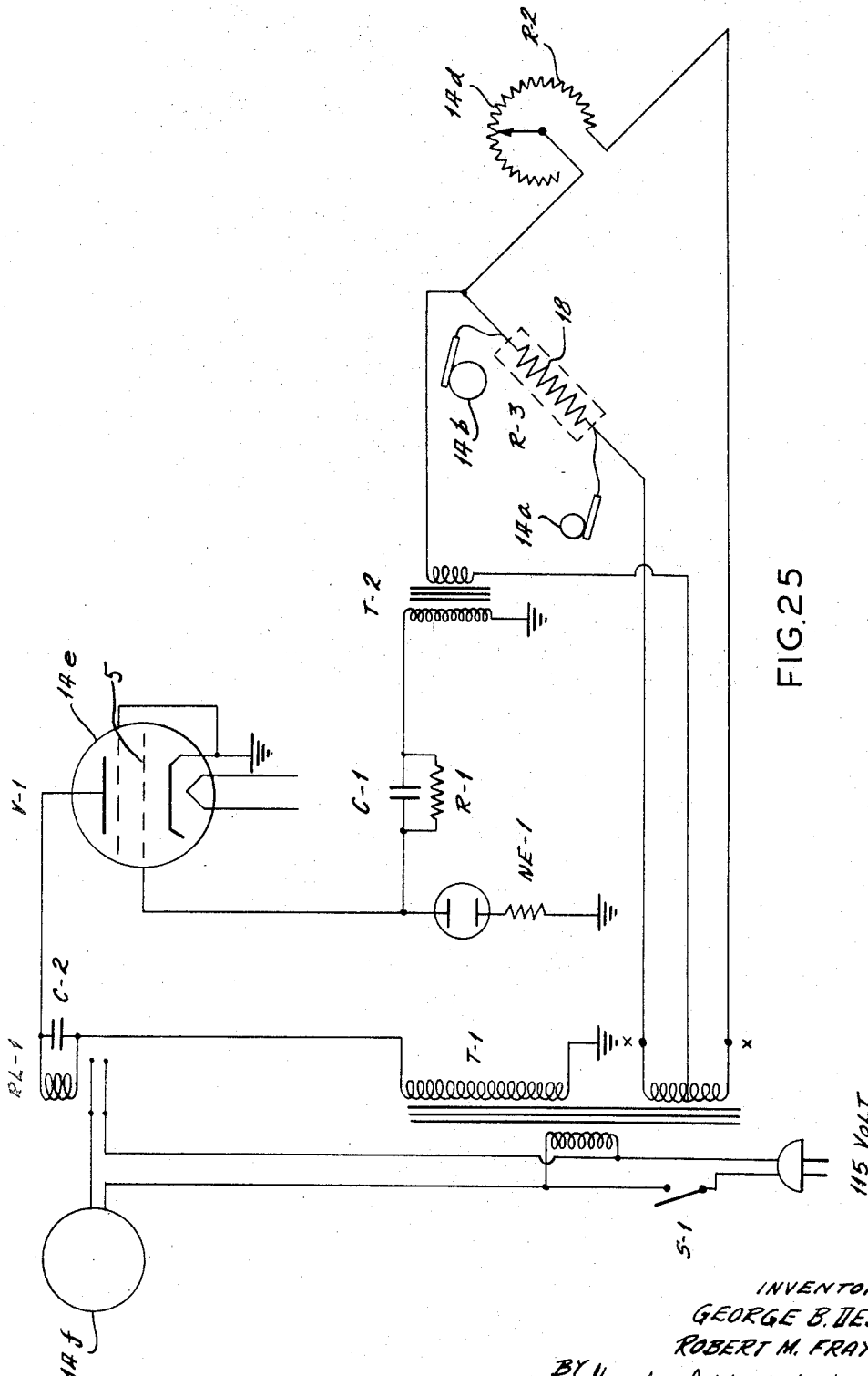

United States Patent Office 3,402,465
Patented Sept. 24, 1968

3,402,465
METHOD FOR CONTINUOUSLY MAKING
SHEATHED HEATING ELEMENTS
George B. Desloge and Robert M. Frayne, St. Louis, Mo., assignors to Watlow Electric Manufacturing Company, St. Louis, Mo., a corporation of Missouri
Filed July 15, 1963, Ser. No. 294,879
14 Claims. (Cl. 29—615)

The present invention relates to metal sheathed electric heating units and methods of making the same, and particularly relates to heating units which may be made by continuous processes.

It is one of the principal objects of the present invention to provide a strip heater utilizing a sinuous electrical resistance heating element surrounded by a compacted granular electrical insulating and heat conducting material and having an outer protective sheath, said heating element being simple and economical to make, preferably by a continuous process in which the terminal connections are added after the fabrication of the heater assembly.

It is another object of the present invention to provide a system and structure for continuously feeding a supply of granular material and sinuous or coiled wire resistance heating element into a continuous metal sheath to continuously form a strip or tubular heater assembly. It is a further object of the present invention to provide methods and structures by which the terminal connections are added to the heater assemblies so produced after compaction and forming thereof.

Another object of the present invention is to provide a method of attaching terminal connections to a strip heater after complete sheathing and fabrication of the assembly.

Another object of the present invention is to provide a sheathed heater assembly utilizing a resistance heating coil having a novel end terminal connection.

Still another object of the present invention is to provide a strip heater utilizing a wire resistance heating element and a granular electrical insulating filler composed of MgO and surrounded by an outer metallic sheath.

These and other objects and advantages will become apparent hereinafter.

The present invention comprises the process of forming a heating assembly wherein the sheath is formed around a wire resistance heating element and a granular electrical insulating filler in a continuous or semicontinuous manner, and further comprises the methods of forming terminal connections and the structures produced by the said processes and methods.

In the drawings, wherein like parts refer to like numbers wherever they occur:

FIG. 1 is a flow diagram of continuous processes of making heaters,

FIG. 2 is a fragmentary sectional view of the nozzle for loading simulated wire and grain simultaneously into the sheath and shows the closing and welding of the sheath, FIG. 3 is a sectional view taken along line 3—3 of FIG. 2, FIG. 4 is an enlarged sectional view taken along line 4—4 of FIG. 2, FIG. 5 is an enlarged sectional view taken along line 5—5 of FIG. 2, FIG. 6 is an enlarged sectional view taken along line 6—6 of FIG. 2, FIG. 7 is a fragmentary plan view showing a strip heater, FIG. 8 is a sectional view taken along line 8—8 of FIG. 7, FIG. 9 is an enlarged fragmentary view of the terminal shown in FIG. 8, FIG. 10 is a plan view of a modified strip heater, FIG. 11 is a sectional view taken along line 11—11 of FIG. 10, FIG. 12 is a sectional view taken along line 12—12 of FIG. 10, FIG. 13 is an elevational view of a curved strip heater, FIGS. 14–17 are views of a modification of the present invention showing an end terminal connection for a coil resistance heater, FIG. 18 shows another terminal modification, FIGS. 19–21 show a modification of the filling nozzle, FIGS. 22–24 show another modification of the filling nozzle, and FIG. 25 is a wiring diagram of the resistance heater element feed control mechanism.

*Filling process*

FIG. 1 shows the flow diagram of continuous filling processes by which the present heating assemblies are continuously formed. The assemblies shown in the drawings may be fabricated in short sections but preferably the overall process is continuous, as will be described hereinafter.

A continuous supply of sheath metal 10 is fed into a series of forming rolls 11 which form the metal 10 into a three-sided form 12 of substantially U-shaped cross section. The U-shaped sheath 12 passes over a downwardly projecting leg or tail 13 of a substantially Y-shaped filling nozzle 14. A continuous supply of granular electrical insulating and heat conducting material 15, preferably magnesium oxide, is attached to one branch 16 of the nozzle 14. A flat second nozzle branch 17 receives a continuous supply of sinuated or coiled wire electrical resistance heating element 18. The granular material 15 and the wire 18 meet at the outlet 21 of the nozzle tail 13. A pair of rolls 19, one back-up and one edge forming, close the free ends of the U-shaped sheath 12 over the nozzle tail 13 to form a closed continuous hollow metal sheath 20. The nozzle outlet 21 projects into the closed sheath 20 and the granular material 15 and wire 18 are discharged into the closed sheath 20. Immediately thereafter, the sheath 20 and contents are vibrated 22, preferably by the action of a reciprocating hammer to partially compact the granular material 15. A welding apparatus 23 seals together the free ends of the sheath 20 to form a continuous outer casing for the continuous heating element assembly 24.

Positioned in front of the inlet opening of the nozzle 14 is a wire feeding and measuring device which includes a double set of rolls. Both sets of rolls are spring loaded in order to provide a squeezing or gripping action. The back set of rolls 14a is driven from the sheath metal 10 and draws the sinuated wire 18 through them at the same rate that the sheath 20 is travelling. The forward set of rolls 14b is controlled by a relay connected into a bridge type circuit housed in a control box 14c. Part of the bridge circuit is the resistance of the sinuated wire between the front rolls 14b and the back rolls 14a.

The desired resistance per inch is set by a calibrated potentiometer 14d which also is connected into the bridge circuit. When the bridge circuit is unbalanced, the output voltage, through a series of step-up transformers, thyratron tubes, and relays 14e, is used to energize an electric motor 14f which drive the forward rolls 14b. The motor 14f constantly is starting and stopping in order to maintain a balance in the bridge network, because the back rolls 14a are synchronized with the sheath metal rate of travel, and are continuously drawing wire 18 through them and into the nozzle 14. The resistance wire 18 is sinuated in a closed bar condition because the automatic resistance control is not capable of closing the bars, but only of stretching or opening them. The wiring diagram of the control mechanism is shown in FIG. 25.

FIG. 25 shows the bridge circuit formed by the potentiometer 14d (resistance R–2), the sinuated wire 18 (resistance R–3) measured between the rollers 14a and 14b, and one of the secondary windings of T–1. T–1 is a power transformer with a double winding on the secondary side, one winding is connected to the thyratron V–1, and the other winding is in the bridge circuit. The bridge circuit winding is center tapped. Any output voltage of this bridge network is applied across the primary of the step-up transformer T–2. The amplified signal at the secondary of T–2 is additive to the existing grid bias voltage supplied by capacitor C–1 and resistance R–1. The capacitor C–1 and resistance R–1 bias the grid 5 slightly under the voltage required to fire the thyratron V–1. In the plate circuit of the thyratron V–1 is the coil of a relay RL–1 acting as a plate load. The normally open contacts of the relay RL–1 control the motor 14f. The back rolls 14a electrically connected to one side of resistance R–3 continuously pull wire out of the R–3 area. This causes the bars of sinuated wire 18 to stretch out, reducing the resistance of R–3. R–2 is preset to the resistance desired between front and back rolls (R–3 area). The reduction of resistance in R–3 causes an unbalance in the bridge circuit. This unbalance is picked up at the primary of the transformer T–2 in the form of a voltage. This voltage is amplified through the transformer T–2 and added to the fixed bias across the capacitor C–1 and resistance R–1 and causes the thyratron V–1 to conduct. Contacts of the relay RL–1 in the motor circuit close, starting the motor 14f. The motor 14f is geared to the front rolls 14b, so as to allow them to push wire into the R–3 area 10 times faster than the back rolls 14a are pulling wire out. When the resistance of R–3 has been increased to that of R–2, the signal voltage at the primary of the transformer T–2 is reduced to zero. The plate circuit of the thyratron table V–1 opens, not having sufficient grid bias to continue to fire. The contacts of the relay RL–1 open and the motor 14f stops. The start-stop motion of the motor 14f continues. As the back rolls 14a are pulling resistance down, the front set of rolls 14b build it up again.

The wire 18 also may be prestretched to obtain a desired resistance per inch of unit, if desired. This may be more practical in certain type operations when the filling head 14 is being used to make units of a specified short length.

Cutter knives 25 cut the continuous heating element assembly 24 to the desired length which may be coiled after leaving the welding station 23 for storage.

Thereafter, the heating element assembly 24 is passed through a compacting station, such as a rolling mill 26 to compact the grain 15 to its final density. A stationary die swager or flat press also could be used. The mill 26 is equipped with the proper hold back, and guides, so that the sheath assembly 24, although coiled while being fed in, is straight and true upon leaving the rolling mill 26 after being compacted. After the final compacting stage, the assembly 24 is cut into the desired heater lengths 27. The compacted lengths of sheath assembly 24 may be stored, before being cut into the heater lengths 27, or the heater may be stored before final compaction.

The final steps in the forming of a heating element structure 28 (FIG. 7) are to insulate the heater wire ends or insulate and close the ends, curve or bend the element if necessary, and attach the terminals. This operation will be described hereinafter under "Terminating Methods and Structures" and is shown diagrammatically in FIG. 1.

An important advantage of the foregoing method for filling a sheath with grain and centering the conductor is that the tendency of the conductor to sag is greatly reduced. Sag is defined as the opening of the turns in a coil or bars in a sinuated wire at the top end thereof. The sagging is caused by the weight of the coil on the bottom pulling at the turns on the top.

With the standard type of filling, the coil is stretched between both ends of a precut sheath. Trouble is encountered when long sheath lengths are combined with a non-rigid coil. The upper portion of the long conductor is called upon to carry the weight of the entire conductor. In our system, the only length of conductor above the nozzle outlet is that which runs between the nozzle outlet and the horizontal portion of the nozzle inlet.

With our system, a heater that requires the use of an extremely small wire can be filled. Also, we can manufacture heaters very small in cross section and very long in length. Our system also can be used to fill precut sheath lengths using any standard method of attaching the terminals and can be used to fill heaters with other than a flat cross section.

The present system reduces the cost of sheath metal by eliminating the cost of tubing, eliminating the normal scrap formed when the conventional 20 foot lengths of sheath are used, reducing the time required to inspect the incoming sheath metal stock, and reducing the normal storage problem.

FIGS. 19–21 show modifications of the filling tube 14 shown in FIGS. 1–3. FIG. 19 shows a Y-shaped filling nozzle 75 having one branch 76 connected to a source of granular insulation, and a second branch 77 divided into two sections, 77a and 77b by a divider 78. Two separate supplies of sinuated wire 18 are fed into the sections 77a and 77b and meet the granular material at the outlet 79 of the nozzle 75. The final heating element (not shown) has two separate heating elements therein. The elements can be joined at one end and terminals attached at the other end (by any of the methods hereinafter described), or the elements can be bridged at both ends with terminals to provide a parallel heating element.

FIGS. 22–24 show another modification of a Y-shaped filling tube 80 having a first branch 81 connected to a source of granular insulation, and a second branch 82 having a heater feed tube 83 mounted therein. The tube 83 is circular in cross section and is connected to a supply of coiled resistance heating element 84. The coil 84 is fed into the tube 83 and meets the granular material at the mouth 85 of the nozzle 80. The depending leg or tail 86 of the nozzle 80 is of circular cross section to make a tubular type final heater (similar to that shown in FIGS. 16 and 17). This requires some modification in the shape of the forming rolls to make a tubular sheath, but this is not critical to the present invention.

The coil element 84 can be placed in a strip (rectangular) heater. This requires that the nozzle tail 86 be rectangular in cross section. One or more tubes 83 may be positioned in the nozzle 80 depending on the number of coils desired in the final heater.

Various combinations of the structure shown in FIGS. 1–3 and 19–23 may be utilized, depending on the shape of the final heater and the type resistance desired, but all utilize the basic filling nozzle and have the sheath formed around the nozzle during the filling process.

*Terminating methods and structures*

Heretofore, strip heater terminals have been attached to the ends of the heating element during the manufacturing process. This introduces undesirable complications into the manufacturing procedure, including use of pressing blocks relieved around the terminal area. Not only are pressing blocks expensive and needed in large quantities but the procedures used with them are inefficient. As we have hereinbefore discussed, we can use a rolling mill to compress the granular refractory-filled sheath to its final density. The rolls of such a mill will not pass an obstruction, such as terminals perpendicular to the axis of the heater on the upper flat faces. Stationary die swagers or flat presses also can be used.

In our continuous process, a continuous strip of filled sheathing is run through the rolls and cut to the desired heater size, with the terminals being attached as the final step in the manufacture of the heater. If curves are desired in the heater, these are formed prior to attachment of the terminals to eliminate any terminal damage resulting from the forming operation. Because of the many areas in which terminals are desired, a large selection of relieved dies or grooved rolls are necessary when curving a heater with the terminals attached. Our invention eliminates the need for relieved dies, grooved rolls, and pressing blocks.

FIG. 7 shows a heater construction 28 having terminals 29 on the flat upper surface. The heater 28 preferably is made from the compacted cut-to-size assembly 27 including a continuous metal sheath. The heater 28 also can be made using our filling technique with precut sheaths. About one-fourth inch of the compacted grain 15 is removed from each end of the sheath assembly 27 and excess resistance heating element wire 11 is removed therefrom. The ends of the sheath assembly 27 then are refilled with magnesium oxide grain 15 and an end plate 30 is forced into each end of the sheath 27a and welded, if required (FIG. 8). Refractory cement or a lava plug could be used instead of the end plate. The structure then may be bent to a curved shape before the adding of terminals 29, if desired (FIG. 13).

An opening 31 then is drilled through the metal sheathing 27a and the grain 15 to expose the resistance wire 11 at a point where it is desired to attach the terminal 29. A conductor 32, preferably having flat head 33, then is placed head down, into the opening 31 with the head 33 in contact with the resistance wire 11. The terminal head 33 preferably is precoated with a high temperature solder 34. The terminal head 33 is heated and solder 34 flows onto the resistance wire 11 making an adequate electrical connection. An extension ring 35 may be welded or soldered about the opening 31 in the sheath 27a before or after the aforementioned drilling operation, or the original hole 31 through the sheath 27a may be made small and the extension ring 35 made by forming the sheath 27a upwardly. A hollow cylinder of lava 36 or other insulating material is passed over the stem of the terminal 32 and into the opening 31. The lava cylinder 36 is pressed or cemented into the area between the terminal stem 32 and the cavity created by the extension ring 35 and opening 31 to provide electrical insulation and also to provide strength from mechanical abrasion and twisting.

An alternate method of attaching a terminal 37 to a side of a heating element construction 28a is shown in FIGS. 10–12. To attach the terminals 37 in this fashion, the grain 15 is removed from the ends of the compacted grain-filled sheath 27a; but all of the excess resistance heating element wire 11 is not cut off. A small length (about one-fourth inch) is left extending out of the compacted grain 15. A sub-metal tube 38 (about 0.05 inch in diameter depending on the wire size) is pushed through a hole 39 provided in the edge of the sheath 27a and slipped over the free end of the wire 11 and attached to make an electrical connection to it (FIG. 11). The ends are now refilled with grain 15. An end plate 40 is forced into the sheath 24 and welded or otherwise fastened (FIG. 12).

The assembly may now be curved before the final steps in the process of attaching the terminals 37 are completed, if desired.

The area of the sheath 27a around the tube 38 is machined away to provide space between the current carrying tube 38 and the metal sheath 27a. The area is indicated by the opening 39.

A flexible lead wire or rigid pin 41 is inserted into the tube 38 and attached to the wire 41 to provide an electrical connection therewith. Refractory cement 42 is mounted over the sheath area adjacent to the opening 39 to provide necessary strength and rigidity to the structure. The refractory 42 fills the space between the tube 38 and the sheath opening 39.

FIG. 13 shows a flat strip heater 28 bent into a circular shape before the terminals 29 are added. This structure is similar in the details of construction to that shown in FIGS. 7–9.

FIGS. 14–17 show modifications using a coil heating element. FIGS. 14 and 15 show a flat heater construction 42 having terminals 43 similar to those shown in detail in FIGS. 16 and 17. The terminals 43 are both at the same end of the structure 42 and the coil elements 44 are embedded in compacted grain 15 and are joined at the opposite end.

The terminal structure 43 is shown in detail in FIGS. 16 and 17 and is suitable for use with a tubular or cartridge type heater or a strip heater with a coiled resistance conductor. This type construction is particularly useful when a bend substantially to the ends of the heater is required (FIG. 16). Heretofore, it has not been practical to bend into the terminal area because a straight portion above the bend is needed in which to apply a bending moment. Also, sheath end distortion results when the bending force is applied near the sheath ends. Furthermore, with the terminals attached, a certain amount of the terminal must necessarily extend into the sheath end. This further aggravates the bending situation by increasing the rigidity of the sheath assembly in the terminal area.

In our method, the sheath 50 (of circular cross section and filled with refractory grain 15) is bent, and the straight section above the bend is cut off. The grain 15 inside the resistance heating coil 44 is removed to a depth of about three-fourths inch. A metallic washer 52 and an insulating washer 53 are slipped over a hollow terminal stem 54. The stem 54 has a shoulder stop 55 formed on its outer surface at a point outside the sheath 50. The stem assembly (the stem 54 and the washers 52 and 53), is inserted into the coil 44 wherein the grain has been removed. A lava cylinder 56 is inserted into the hollow terminal stem 54 and compressed (FIG. 17). A punch forced against the end of the lava cylinder 56 through the hollow stem 54 may be used for this step. This causes the end of the stem 54 in the coil 44 to expand outwardly making an electrical contact with the coil 44. A removable rubber cylinder may be used instead of lava. A rigid pin or a flexible lead 57 may then be inserted into the hollow stem 54 extending out from the sheath and welded, soldered or crimped into place.

The foregoing operation is useful with a continuous process of making tubular heaters as hereinbefore explained. It is also useful in converting standard filling equipment to semi-continuous fill, i.e., to fill a long section and cut it into shorter lengths.

FIG. 18 shows another end terminating technique suitable for use with a strip heater having a sinuated wire element and compacted grain insulation.

In this method, compacted grain is removed from end of the heater sheath assembly 28b to a depth of about three-eighths inch. All of the sinuated wire resistance element 11 is removed except the last bar. This length of wire is bent up, so that about one-half inch is extending out of the sheath assembly end. A flat ribbon terminal 58 is attached (soldered or spotwelded or crimped) to the wire extension. The wire extension then is bent down into the heater end carrying with it the attached ribbon terminal. The empty sheath ends are filled with a refractory material which electrically insulates the terminal and provides strength. The preferred method is to insert a crushable refractory preform 59 having an opening 60 to receive the terminal 58 into this area and compress or set the preform 59 into place. However, refractory cement may be used. Cements have inferior high temperature qualities. Secondly, the moisture present in the cement necessitates a dry-out period. A combination of preform and cement and/or grain can be used. The preform 59 used in conjunction with cement, would be a much tougher grade than that used in the preferred method. The cement holds the preform in place, seals the area about the terminal ribbons 58 from leaking out grain.

Advantages of our novel strip heaters

The present flat, metal sheathed, compacted grain filled heater having a resistor wire formed to a sinuous shape and having terminals mounted on the ends, edges, and at right angles to the center plane extending through the metallic sheath and being flat in cross section before filling expands the application versatility of a strip type heater. The present strip heater is preferably fabricated with our simultaneous process. It can be fabricated using coil resistor centering techniques known in prior art tubular heater manufacturing. The latter however, limits termination to the ends (some position as in FIGURE 18, but not necessarily the same technique). Conventional strip heaters are limited to service temperatures of approximately 1200° F., whereas the present heater has a service temperature of 1600° F. Consequently, our heater can be used in applications normally requiring the high temperature capabilities of a tubular or high temperature cartridge type heater and also where space and shape limitations require a flat section.

A strip heater is more adaptable in wrap around, clamp on, and clamp between applications. When using tubular heaters, a groove must be machined in one or both of the parts to be heated in order to increase the area of contact between the heater and the heated part. This is not necessary in strip heaters. Our high temperature, flat heaters do not offer as much wind resistance as do cartridge and tubular types. For this reason, they can be used to an advantage in forced air heating applications. Furthermore, in the heater, the sinuous shaped conductor lies entirely in one plane parallel to the flat sides of the sheath and since all the wire is kept at a minimum distance from the sheath, results in a lower temperature gradient between the sheath and the conductor.

Some present strip heater constructions comprise mica, cement, fibrous, or loosely packed granular insulation.

We use highly compacted pure magnesium oxide which has a better dielectric strength and/or higher thermal conductivity, resulting in lower temperature gradients between the resistance wire and the operating surface of the sheath. Mica and fibrous sheet insulation create voids around the conductor wire which reduces the effectiveness of the insulation in carrying heat to the sheath. Lower temperature gradients increase the life of the heater or result in higher sheath temperature for a given life. Greater dielectric strength reduces the number of burnouts caused by current leakage through the insulation from the wire to the sheath.

Some presently made strip heaters, using grain insulation, require the use of expensive cores to center the resistance heater in the sheath. As herein stated, we use pure magnesium oxide without the use of expensive cores.

Sinuous shaped wire is an inexpensive conductor as compared to flat ribbon wound around a strip of insulation material. Furthermore, coils in a heater necessarily increase the thickness, since adequate spacing must be maintained between the conductor and the sheath. Increased thickness of element causes increased costs of insulation and sheathing and also places part of the resistance element further from the sheath thus causing it to operate at a higher temperature.

Furthermore, the combination of a welded sheath seam and minimum heater thickness and compacted grain fill increases the formability of the heater when it is desired to curve the heater to a specified diameter for clamp around application.

If a round heater is compressed into a flat heater, the grain density is non-uniform throughout the width of the heater since the pressures through the center are greater in forming the heater. By starting with a flat heater sheath, more uniform insulation density is obtained.

Thus it is seen that the flat strip heater using a sinuous wire resistance member and a compacted MgO insulation results in a high temperature and/or long life strip heater having many advantages in construction, fabrication, and application versatility.

The present invention also provides a unique method and apparatus for filling a sheath simultaneously with a centered resistance wire, either sinuous or coil, and grain.

Novel termination structures adapted for use with flat and circular sheaths and with continuous filling and fabrication processes also are provided by the present invention.

This invention is intended to cover all changes and modifications of the examples of the invention herein chosen for purposes of the disclosure, which do not constitute departures from the spirit and scope of the invention.

What is claimed is:

1. A process of making a heater including the steps of continuously forming a closed metal sheath around a hollow discharge leg of a filling nozzle, said nozzle having fill sections communicating with the discharge leg, continuously feeding a wire resistance heater and a granular electrical insulating and thermal conducting material simultaneously into separate fill sections of the nozzle, coordinating the rate of feed of the resistance heater to the rate of formation of the metal sheath, continuously mixing the resistance heater and the granular material in the closed sheath at the outlet end of the discharge leg of the nozzle, spacing the resistance heater from the sheath, partially compacting the granular material to maintain the resistance heater in its predetermined location in the sheath, reducing the cross-sectional area of the sheath to compact the granular insulating material to final density and recovering a continuous length of strip heater without projecting terminal connections.

2. The process of claim 1 wherein the wire resistance heater is of sinuated shape.

3. The process of claim 2 including the steps of cutting the continuous length of strip heater into desired heater lengths, closing the ends of the said heater lengths, and thereafter attaching contact terminals to the said heater lengths.

4. The process of claim 1 wherein the granular material is MgO.

5. The process of claim 1 including the steps of removing a portion of the resistance heater and the compacted grain from the ends of the heater lengths and refilling the ends with electrical insulating material prior to closing the ends, providing an opening through the sheath and the granular material to expose the heater, attaching a terminal to the heater through the opening, providing a tubular extension on the sheath around the opening, and positioning an insulating member between the terminal and the tubular extension and sheath to electrically insulate therebetween and provide support for the terminal.

6. The process of claim 1 including the steps of providing an opening in a side of the assembly, attaching a tubular member smaller than said opening to an end of the wire heater prior to making the end closure, attaching a conductor to the tube, and positioning refractory cement around the tube between it and the sheath to electrically insulate the same.

7. A method of simultaneously introducing a granular material and a continuous sinuous resistance heater into a continuously formed hollow flat strip sheath including the steps of continuously passing a U-shaped sheath over the tail of a Y-shaped nozzle, introducing a continuous supply of granular material and sinuated wire into the spaced branches of the Y-shaped nozzle, controlling the resistance of the sinuated wire per unit of length, closing the open side of the U-shaped sheath over the tail of the nozzle, and continuously introducing the granular material and the sinuated wire into the closed sheath.

8. A process of making a resistance heater including the steps of:

(A) continuously supplying sheath metal to a forming station, (B) continuously supplying an electrically insulating granular filler material and a resistance heating element to a filling station comprising two members, one for conveying the insulating material and one for guiding the resistance heating element, (C) simultaneously and continuously forming the sheath metal at the forming station into a circumferentially closed sheath around the discharge portion of said filling station, positioning the resistance heating element inside of said filling station, filling the sheath with the resistance heating element and electrical insulating granular filler material;

(D) partially compacting the insulating material within the circumferentially closed sheath to fix the resistance heating element inside the sheath spaced from the inside wall surfaces thereof, (E) and thereafter reducing the sheath in cross-sectional area to further compact the filler within the sheath to its final density.

9. The process of claim 8 wherein the steps of cutting the continuously formed heater into lengths of the desired size and thereafter attaching terminals to the resistance heating element.

10. The process of claim 9 wherein grain is removed from the cut off ends of the lengths, the excess resistance heating element removed, terminals connected to the resistance heating element, and the ends refilled with electrical insulating material.

11. The method of claim 10 wherein openings are formed in the sheath surfaces to expose portions of the resistance heating element and the terminals are connected to the so exposed portions.

12. The method of claim 8 wherein the resistance heating element is a sinuated wire.

13. The method of claim 8 wherein the resistance heating element is a coiled wire.

14. The method of claim 8 wherein the sheath is reduced in cross-sectional area by passing the same through reducing rolls.

References Cited

UNITED STATES PATENTS

| | | | |
|---|---|---|---|
| 1,127,281 | 2/1915 | Read. | |
| 1,669,385 | 5/1928 | Wiegand et al. | 29—614 |
| 2,330,652 | 9/1943 | Wiegand | 252—63.2 |
| 2,472,145 | 6/1949 | Cappell | 29—614 X |
| 2,690,490 | 9/1954 | Charbonneau | 29—615 X |
| 2,718,577 | 9/1955 | Sherk | 252—63.2 |
| 2,680,086 | 6/1954 | Hollingsworth et al. | 29—614 |
| 2,735,162 | 2/1956 | Huck | 29—155.63 |
| 3,085,316 | 4/1963 | Nelson | 29—155.63 |
| 2,939,099 | 5/1960 | Morey | 338—243 |
| 2,942,222 | 6/1960 | Nelson | 338—243 |
| 2,648,167 | 8/1953 | Ellwood | 29—203 |
| 2,973,572 | 3/1961 | Oakley | 29—203 |

JOHN F. CAMPBELL, *Primary Examiner.*

J. CLINE, *Assistant Examiner.*